May 14, 1968   L. L. CLOUTIER   3,382,620

VEHICLE BODY

Filed Oct. 6, 1966

INVENTOR.
Laurent L. Cloutier

BY

Herbert Furman

ATTORNEY

United States Patent Office 3,382,620
Patented May 14, 1968

3,382,620
VEHICLE BODY
Laurent L. Cloutier, Rochester, Mich., assignor to General Motors Corporation, Detroit, Mich., a corporation of Delaware
Filed Oct. 6, 1966, Ser. No. 584,879
5 Claims. (Cl. 49—506)

This invention relates to vehicle bodies and more particularly to a method of locating the edge portion of a vehicle body window within a weatherstrip channel.

Conventionally, most hardtop body styles include a roof rail weatherstrip which includes a channel for receiving the upper edge portion of the door window when the window is in closed position. The upper edge portion of the window must be located a sufficient distance within the weatherstrip channel to provide a seal and prevent wind noise yet not be located too deeply within the weatherstrip channel to result in unnecessary deformation of the weatherstrip.

The window is conventionally located within the weatherstrip channel by applying tabs or stickers on the outer surface of the window which extend from the edge thereof the required distance which the window is to be located within the channel. When the stickers are concealed from view, the window is located in the correct closed position. The blocks or stops which conventionally limit movement of the window to closed position can then be fixed relative to the body to fix the closed position of the window and the location of the edge portion of the window within the weatherstrip channel. This is necessarily a time-consuming method since the stickers must be placed on the window, the window correctly adjusted, and the stickers removed.

This invention simplifies the locating of the edge portion of the window within the weatherstrip channel and does away with the necessity of using stickers or other types of removable locating means on the window.

In the preferred embodiment of the invention, the outboard leg of the weatherstrip is provided with at least two spaced recesses or shallow openings which open both downwardly and outwardly of the body. The bases or upper edge portion of these recesses are located a predetermined distance into the weatherstrip channel as measured from the opening thereof. Alternatively they may be located a predetermined distance from the base of the weatherstrip channel. The body window is provided with a ground upper edge which is generally arcuate in cross section. This ground edge is light reflecting when viewed transversely of the window. The window is moved to a position wherein the ground upper edge thereof is located within the weatherstrip channel and does not reflect light except for the edge portions located within the shallow openings. Thereafter the window is moved slightly upwardly until the edge portions are moved past the shallow openings so that they are concealed from view and do not reflect any light through the openings. At this position the upper edge of the window is located the desired distance within the weatherstrip channel so that an adequate seal is obtained and the weatherstrip is not unnecessarily deformed. The window stops or blocks are then adjusted relative to the body to fix the closed position of the particular window for the particular body.

It shouuld also be noted that current production frameless vehicle body windows are currently provided with a ground upper edge. Thus, the method of this invention takes advantage of current production window regulator mechanisms, door windows, and body weatherstrips.

The primary feature of this invention is that it provides an improved method for locating a vehicle body window within a weatherstrip channel. Another feature is that the method of locating the window takes advantage of current conventional body structures. A further feature is that the method does not require the use of any locating means which must be applied and removed.

These and other features of this invention will be readily apparent from the following specification and drawings wherein.

Figure 1:
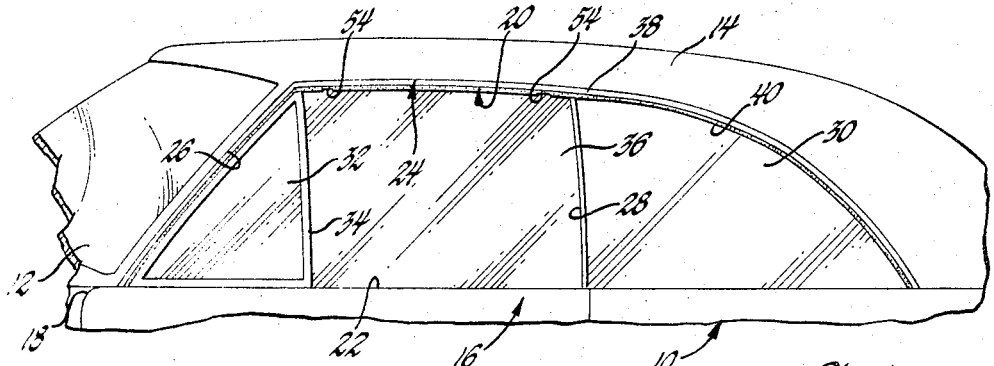
FIGURE 1 is a partial side elevational view of a vehicle body embodying the method of this invention locating the front door window with respect to a roof rail weatherstrip, with the window being shown in closed position in sealing engagement with the weatherstrip.

Referring now particularly to FIGURE 1 of the drawings, a vehicle body 10 of the two door hardtop style includes a windshield 12, a roof structure 14 and a front door 16 which is mounted adjacent its forward edge 18 on the body 10 for swinging movement between a closed position, as shown, and an open position, not shown. The front door window opening 20 is defined by the upper edge portion or belt line 22 of door 16, the roof rail weatherstrip structure 24, the windshield pillar 26, and the forward edge 28 of the rear quarter window 30.

The forward portion of the window opening 20 is opened and closed by a conventional ventilator window 32 which is mounted within a frame 34 secured to the door 16. The window 32 is movable about a generally vertical axis between a closed position, as shown, and an open position, not shown, transversely of frame 34. The rearward portion of the opening 20 is opened and closed by a conventional vertically movable door window 36. The window 36 is mounted on the body 10 for movement between a closed position, as shown, and an open position, not shown, wherein the window 36 is located within the door 16. The mounting means for the window 36 comprise any one of an number of conventional window regulator mechanisms. Conventionally, the window 36 is located in closed position by a number of adjustable bumpers or stops which limit upward movement of the window by the window regulator mechanism.

Figure 4:
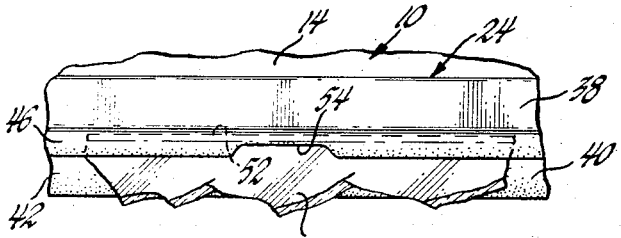
FIGURE 4 is a view similar to FIGURE 2 showing the window in fully closed position.
Figure 5:
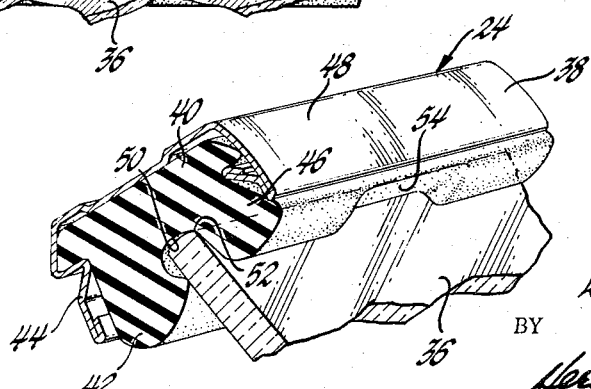
FIGURE 5 is an enlarged partially broken away perspective view of a portion of FIGURE 1.

The weatherstrip structure 24 is conventional, and, as shown in FIGURE 5, includes a molding 38 which is fixedly secured to the body roof rail, not shown, and a generally U-shaped weatherstrip 40 mounted in the molding. The weatherstrip 40 includes an inner leg 42 which is interlocked with the inner leg 44 of molding 38, and a shorter outer leg 46 which is interlocked with the outer leg 48 of the molding. The legs 42 and 46 and the body of the weatherstrip 40 define a window receiving channel 50 which receives the upper edge portion of the window 36 when the window is in closed position, as shown in FIGURES 4 and 5.

With reference to FIGURE 5, it is desirable that the upper edge portion of the window 36 be located a sufficient distance within channel 50 to provide a seal and prevent wind noise but either slightly engage or be slightly spaced from the base of the channel 50 in order to prevent unnecessary weatherstrip deformation and possible failure.

The window 36, as well as most current production frameless windows, has its upper edge 52 ground cn a radius to avoid any sharp edges. This ground edge 52 is light reflecting when viewed transversely of the window.

The outer leg 46 of the weatherstrip 40 includes two spaced shallow notches or recesses 54, FIGURE 1. As shown in FIGURE 5, the notches 54 are shallow and extend through the outer leg 46 to the channel 50 to provide a sight means so that the window and particularly the edge 52 thereof can be viewed through the notches from the exterior of the body. Preferably these notches are formed when the weatherstrip 40 is formed so that the surfaces which define the notch have a skin thereon and there is no break in the outer covering or seal of the weatherstrip.

Figure 2:
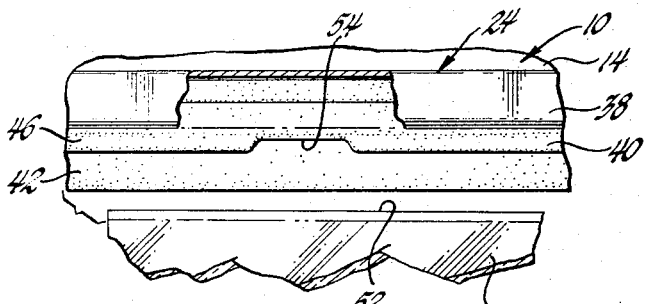
FIGURE 2 is an enlarged, partially broken away view showing the window in slightly open position with respect to the weatherstrip.
Figure 3:
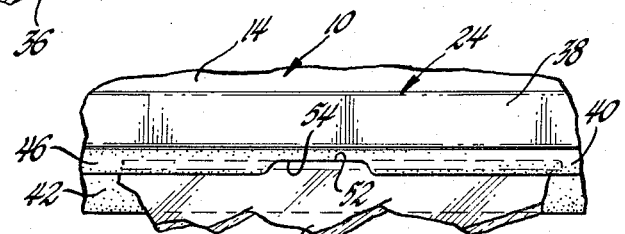
FIGURE 3 is a view similar to FIGURE 2 showing the window in substantially closed position.

In order to locate the window 36 in closed position, it is first raised to the position shown in FIGURE 2. In this position, the ground upper edge 52 will reflect light continuously along the upper edge of the window 36. An operator standing exteriorly of the body can easily see this reflected light when the notches 54 are generally at eye level. Since it is much easier to see the upper edge of the window while standing outside the body rather than sitting inside the body, it is preferable that the window be adjusted with the operator viewing the eddge from the exterior of the body through the recesses 54 with the recesses being located generally at eye level. Thereafter, the window is raised to the position shown in FIGURE 3 wherein only the portion of the upper edge 52 which is located within the notches 54 is visible and will reflect light. The portions of the edge 52 received within the channel 50 to each side of the notches 54 are not visible. In this position of the window, the upper edge 52 is not located a sufficient distance within the channel 50 to obtain an adequate seal and prevent wind noise.

Thereafter the window 36 is again slightly raised to the position shown in FIGURE 4 wherein the ground edge 52 is not visible through the recesses 54. In this position, it is known that the window is raised to its desired height or that the edge 52 is located the desired distance within the channel 50. When the window has been located in its position shown in FIGURE 4, the stops or blocks which fix or limit movement of the window are then adjusted relative to the body to fix the closed position of the window within the weatherstrip channel 50. Thereafter no further adjustment should be necessary and the window will always be located in its desired position when in closed position.

The details of the window regulator mechanism and the adjustable stops or blocks are not shown since they are conventional and in current production use.

The notches 54 are located in the outboard leg since it is easier for the operator to view the window from the exterior of the body, particularly with modern curved glass windows. By providing two notches the forward and rearward portions of the window can be vertically adjusted relative to each other.

Thus, this invention provides an improved method of locating vehicle windows on vehicle bodies.

I claim:
1. A method of locating the edge portion of a movable window within a weatherstrip channel comprising, providing sight means through the weatherstrip to the channel located a predetermined distance from the channel opening, providing light reflecting means on the edge portion of the window, and moving the window within the weatherstrip channel until the light reflecting means are moved past the sight means and concealed from view therethrough.

2. The method recited in claim 1 wherein the light reflecting means comprise a ground edge on the window.

3. The method of claim 1 wherein the sight means comprise at least one opening through a portion of the weatherstrip defining the channel.

4. The method of claim 1 wherein at least two spaced sight means are provided.

5. The method of claim 1 wherein the sight means comprise shallow recesses in a channel-defining leg of the weatherstrip, with the bases of the recesses being located a predetermined distance within the weatherstrip channel as measured from the opening thereof.

References Cited

UNITED STATES PATENTS

| 2,504,510 | 4/1950 | Ernest | 49—440 |
| 3,131,439 | 5/1964 | Wilfert | 49—440 XR |
| 3,328,918 | 7/1967 | Brissette | 49—440 XR |

KENNETH DOWNEY, *Primary Examiner.*